United States Patent
Liepold et al.

[11] Patent Number: 6,102,326
[45] Date of Patent: *Aug. 15, 2000

[54] HUB FOR INFORMATION MEDIA

[75] Inventors: August Liepold; Bernd Scholtysik; Hartmut Thiele; Jose' Toral, all of Munich, Germany

[73] Assignee: Emtec Magnetics, Germany

[*] Notice: This patent is subject to a terminal disclaimer.

[21] Appl. No.: 08/946,590

[22] Filed: Oct. 7, 1997

Related U.S. Application Data

[62] Division of application No. 08/570,196, Dec. 11, 1995, Pat. No. 6,047,921, which is a continuation of application No. 08/121,433, Sep. 16, 1993, abandoned, which is a continuation-in-part of application No. 07/835,833, Feb. 18, 1992, Pat. No. 5,257,749.

[30] Foreign Application Priority Data

Feb. 22, 1991 [DE] Germany ............... 41 05 604

[51] Int. Cl.$^7$ ............... B65H 75/24; B65H 75/14; B65H 75/18
[52] U.S. Cl. ............... 242/571.5; 242/571.4; 242/611.2; 242/610.6
[58] Field of Search ............... 242/571.4, 571.5, 242/610.6, 613.5, 613, 118.2, 118.32, 611.2

[56] References Cited

U.S. PATENT DOCUMENTS

| | | | |
|---|---|---|---|
| 3,066,794 | 12/1962 | Mulheren et al. | 242/610.6 |
| 3,632,053 | 1/1972 | Edwards | 242/571.4 |
| 3,726,489 | 4/1973 | Honsa | 242/610.6 |
| 4,081,151 | 3/1978 | Ender et al. | 242/610.6 |
| 4,280,670 | 7/1981 | Schor | 242/605 |
| 4,923,137 | 5/1990 | Jorgensen et al. | 242/571.4 |

*Primary Examiner*—John Q. Nguyen
*Attorney, Agent, or Firm*—Keil & Weinkauf

[57] ABSTRACT

A hub, on which compressing of the inner central bore is to be minimized during the winding up of an information medium in tape form under high winding pressure. According to one embodiment, this is achieved by an outer hub ring having a strong profile being provided alongside the outer winding area and by there also being elastically deformable intermediate elements between outer hub ring and inner hub ring. Such elements provide for a compression ratio of the compressed diameters of a the inner to the outer ring of less than 1:4. In the case of a further embodiment, variously shaped openings or notches, which are distributed evenly over the entire circumference, are provided on both sides of the hub between its outer circumference and inner circumference. In a still further embodiment the elastically deformable intermediate elements consist of webs running in radial and circumferential directions and residual portions between openings provided between the periphery of the outer ring and said webs.

11 Claims, 10 Drawing Sheets

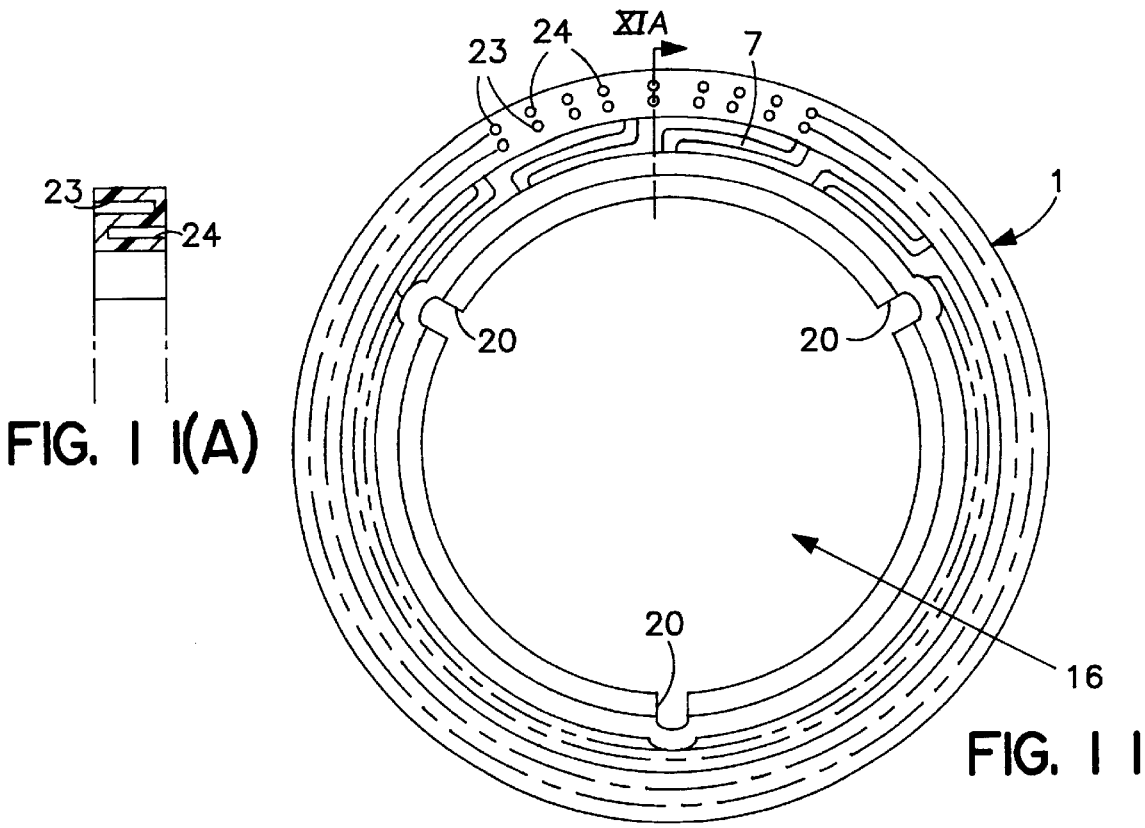
FIG. 11(A)
FIG. 11
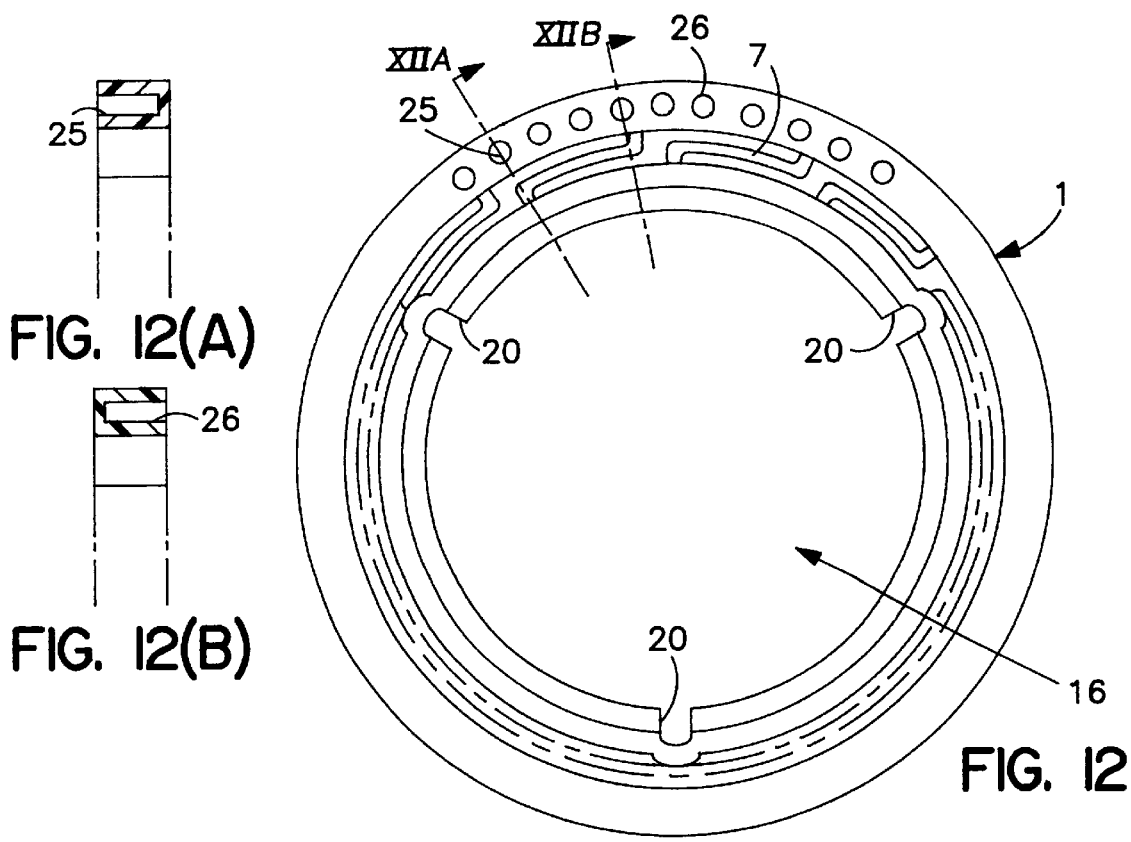
FIG. 12(A)
FIG. 12(B)
FIG. 12

HUB FOR INFORMATION MEDIA

This is a Division of application Ser. No. 08/570,196, filed Dec. 11, 1995, now U.S. Pat. No. 6,047,921, which is a continuation of Ser. No. 08/121,433, filed Sep. 16, 1993, abandoned, which is a CIP of Ser. No. 07/835,833, filed Feb. 18, 1992 U.S. Pat. No. 5,257,749.

FIELD OF THE INVENTION

Hub for wound-up information media in strip or tape form the width of the outer winding area of the hub substantially corresponding to the width of the medium to be wound up, the hub having a central bore and driving cut-outs on its inner circumference and comprising an outer ring and an inner ring which are connected to each other.

BACKGROUND OF THE INVENTION

Once the magnetic coating has been produced on a flexible base in tape form, information media, for example magnetic tapes, are cut to the width required for use and are wound onto flanged reels or flangeless hubs in a length of up to several thousand meters. For this purpose, the hub is fitted with its central bore onto the drive spindle of a winding machine and the information medium is wound up at high speed and under a appropriately adapted winding pressure. In general, to save on cost and weight, the hubs have between the outer winding area and the inner circumference areas of restricted cross section, radially running reinforcing ribs being provided to increase the stability in this zone where the material is thinner. An example of such a hub is mentioned in DE-U 77 22 919. A stackable hub, on which the tape rolls, stacked one on top of the other, are secured against twisting and consequently against damage, is known from DE 24 48 853.

During winding of the information media onto said hubs as well as during rewinding, such high tensions in the tape may occur that the winding pressure causes the hub bore to be constricted, as a result of which the hubs can no longer be fitted onto the drive spindle of the winding apparatus or cannot be pulled off it. To counter this problem, it is known to produce the hubs from glass fiber reinforced plastic and, if appropriate, to dispense with the thinning of the material mentioned; in addition, hubs of metal are in use. However, for reasons of weight and cost, these solutions have considerable disadvantages.

To avoid the constriction of the hub bore, the already mentioned Utility Model 77 22 919 discloses a radially running threading slit, which is constricted during winding and thereby takes up the winding stress. U.S. Pat. No. 3,632,053 discloses a flanged reel, the hub of which has the generic properties mentioned at the beginning and on which, in addition, flexible intermediate elements are respectively provided between hub and flange in order to avoid transmitting the compression to the flanges. However, as the description reveals, this known hub also requires glass fiber reinforced polystyrene or metal as the material for the hub. It can also be read in the description of EP-A-375 322 of the same applicant that, in spite of the flexible intermediate elements, the inside diameter of the hub is still to much compressed. In the latter document, to avoid this compression it is proposed to provide between outer and inner ring a number of obliquely running ribs, with a constriction in thickness over their lengths which have the consequence of twisting the outer ring against the inner ring. U.S. Pat. No. 4,052,020 discloses a reel for a computer tape, on which the outer winding area in this way to absorb the stress occurring during winding.

French-A-22 33 675 discloses in a tape cassette a tape reel which has a double Y-shaped cross-section and with elastically deformable arms of curved shape between the inner and outer rings of said reel. Those deformable arms serve to facilitate the introduction of the drive axes into the drive openings when these are being engaged by the drive axes of the apparatus. There is no task of tape winding problems in general.

Setting out from the prior art mentioned above, it is an object of the present invention to provide a hub of the generic type mentioned at the beginning which does not have the disadvantages of the prior art, which is furthermore made of plastic and is to do without reinforcing additives, for example glass fibers or glass beads, because this presents recycling problems. Moreover, it is a further object of the present invention that dishing of the tape roll does not occur when a number of hubs bearing rolls of tape, known as pancakes, are stacked one on top of the other, and that such a stack of pancakes does not present any problems during transport and storage.

SUMMARY OF THE INVENTION

We have found that this object if achieved with hub for wound-up information media in strip or tape form, the width of the outer winding area of the hub substantially corresponding to the width of the medium to be wound up, the hub having a central bore and driving cut-outs on its inner circumference and comprising an outer ring and an inner ring which are connected to each other by flexibly deformable intermediate elements extending in radial and circumferential directions and preventing any relative movement of the outer ring to the inner ring in its circumferential direction, the hub with the medium wound thereon having a compression ratio of the compressed diameter of the inner ring to the compressed diameter of the outer ring of less than 1:4.

Another embodiment of the invention is a hub for wound-up information media in strip or tape form, wherein the flexibly deformable intermediate elements are formed as residual portions between openings which are arranged in a sequence and evenly distributed over the circumference of the hub.

A further embodiment of the invention is a flangeless stackable hub for wound-up information media in tape form, the width of the winding area of the hub substantial corresponding to the width of the information medium to be wound up, the hub having a central bore as well as driving cut-outs on its inner circumference and comprising an outer ring and an inner ring, which are connected to one another by flexibly deformable intermediate elements extending in radial and circumferential directions but preventing any relative movement at the outer ring to the inner ring in its circumferential directions, wherein a plurality of concentric annular notches are provided between outer circumference and inner circumference, the notches being offset with respect to one another in he radial direction in a meandering form.

Further details of the invention and expedient embodiments are contained in the subclaims, the drawings and the description.

SHORT DESCRIPTION OF THE INVENTION

The invention will now be explained in further detail with reference to the drawings, in which:

FIG. 1 shows a plan view of a first embodiment of the hub according to the invention FIG. 2 shows a cross section through a hub according to FIG. 1 along the line II/II FIGS. 3–19 show plan views of further preferred designs of the hub according to the invention with flexible elements.

PREFERRED EMBODIMENTS OF THE INVENTION

A feature of the embodiment according to FIGS. 1 and 2 is that the outer ring 2 of the hub comprising two concentric rings has a double-T structure, which can be seen in cross-section, and that annular flexible intermediate elements 4 are arranged evenly distributed in the circumferential direction between the outer ring 2 and the inner ring 3. By the combination of the double-T profile and said flexible intermediate elements 4, a transmission of the compression from the outer ring to the inner ring is minimized in a particularly effective way and, at the same time, a significant weight saving is accomplished, without having a reinforce the thermoplastic material with glass fiber or similar additives. The inner ring 3 can have axial projections, known per se, on both its sides 5, 6, which projections are mutually offset in the radial direction, so that the hubs are protected against shifting when they are stacked. In addition, the central bore 16 of the hub likewise has driving cut-outs 20, similarly known from the prior art.

Instead of the annular axial projections 5, 6, mentioned above, the inner ring 3 may also be provided with a plurality of deformations 17, 18, which extend alternately to both sides in the circumferential direction on the inner circumference of the hub and respectively interlock when a number of hubs are stacked one on top of the other, and in this way prevent them from being rotated with respect to one another. Such hubs are known from the already mentioned DE 24 48 853. As a result, the width of the inner ring 3 on said embodiments is greater than the width of the winding area 1. FIG. 3 represents another embodiment, in which, instead of the annular flexible intermediate elements 4, S-shaped webs 7, extending in radial and circumferential directions, are arranged evenly distributed.

Further, likewise advantageous embodiments of the present invention can be seen from FIGS. 4, 6, 7 and 8. These embodiments have in common that the hub does not comprise two concentric rings, but that openings, evenly distributed over the circumference on both sides, are provided between the outer circumference or the winding area 1 and the inner bore 16, which openings both mean a material saving and have the consequence of the required compression of the outer circumference on account of the winding pressure, so that the compression being transferred hardly to the inner hub. The following shapes have proved successful here:

According to FIG. 4, the circular openings 8, 9 are arranged in one or more concentric circles, it being possible for the openings to be of different sizes and to be arranged offset with respect to one another.

FIGS. 5, 5a have as compression elements annular notches 11 which, as FIG. 5a shows in cross-section, are on both sides offset with respect to one another in the radial direction in a meandering form.

According FIG. 6, the openings are punched out in a H shape 12, the structure circumferentially at an acute angle with respect to the as an example.

In the case of the abovementioned embodiments as well, axial projections of deformations 5, 6, 17, 18 are provided in the vicinity of the inner circumference or of the hub bore, as already described in further detail above, in order in this way to avoid a displacing or rotating of the hubs stacked one on top of the other.

We now refer to the embodiments of FIGS. 9 to 19.

Thereof FIGS. 9 to 13 show embodiments with openings and S-form webs in combination.

Figure 14:
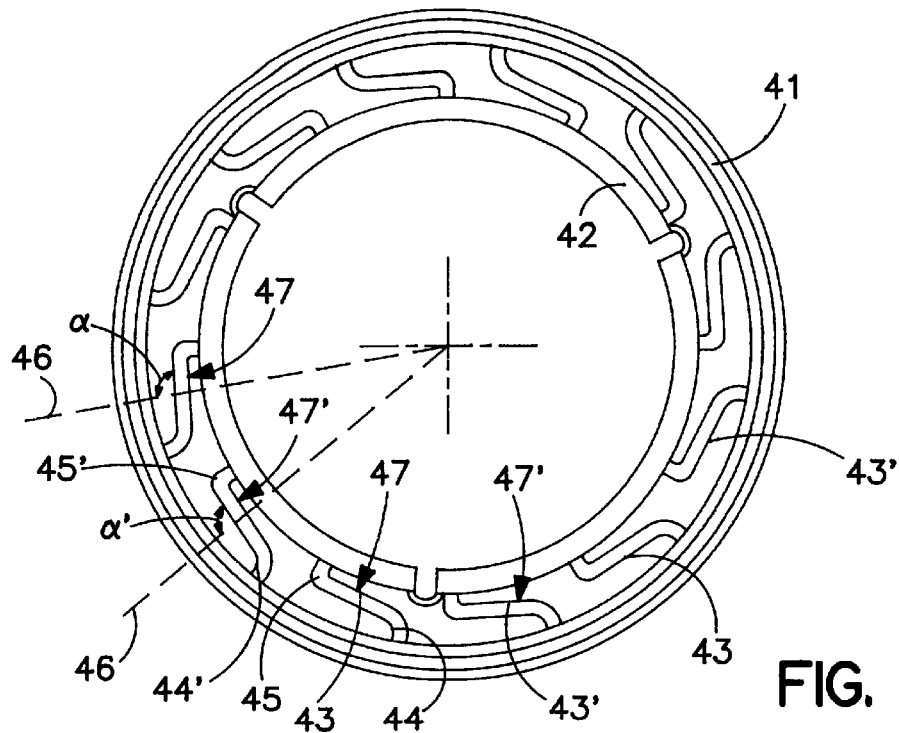
Figure 15:
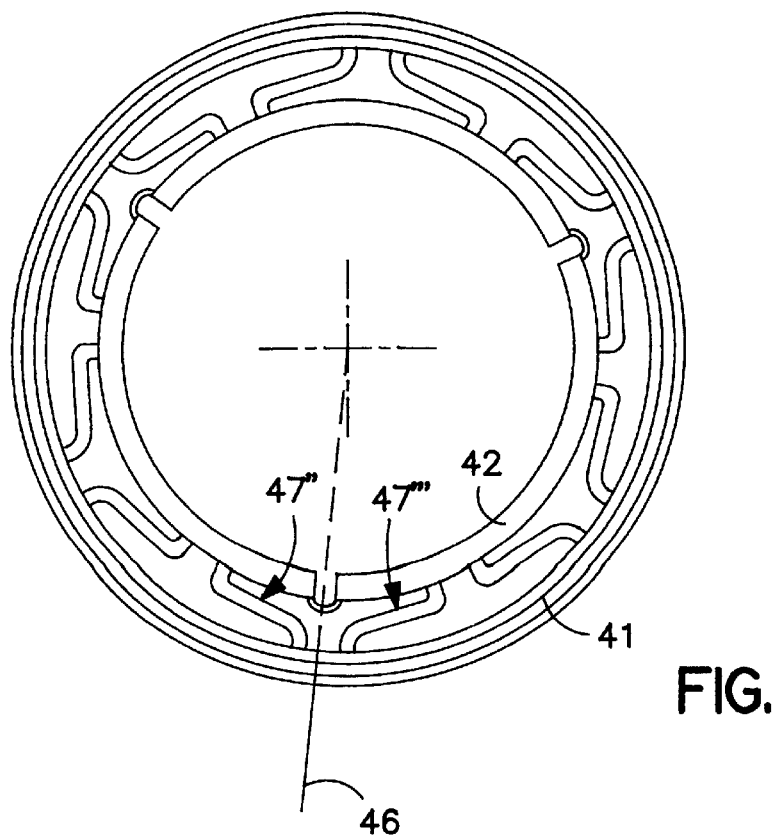

FIGS. 14 and 15 show S-form web embodiments with a specific angular configuration and arrangements of the S-form webs and FIGS. 16 to 19 show flexible deformable intermediate elements in other forms or shapes than the S-form webs which are comparable with the latter.

Figure 9:
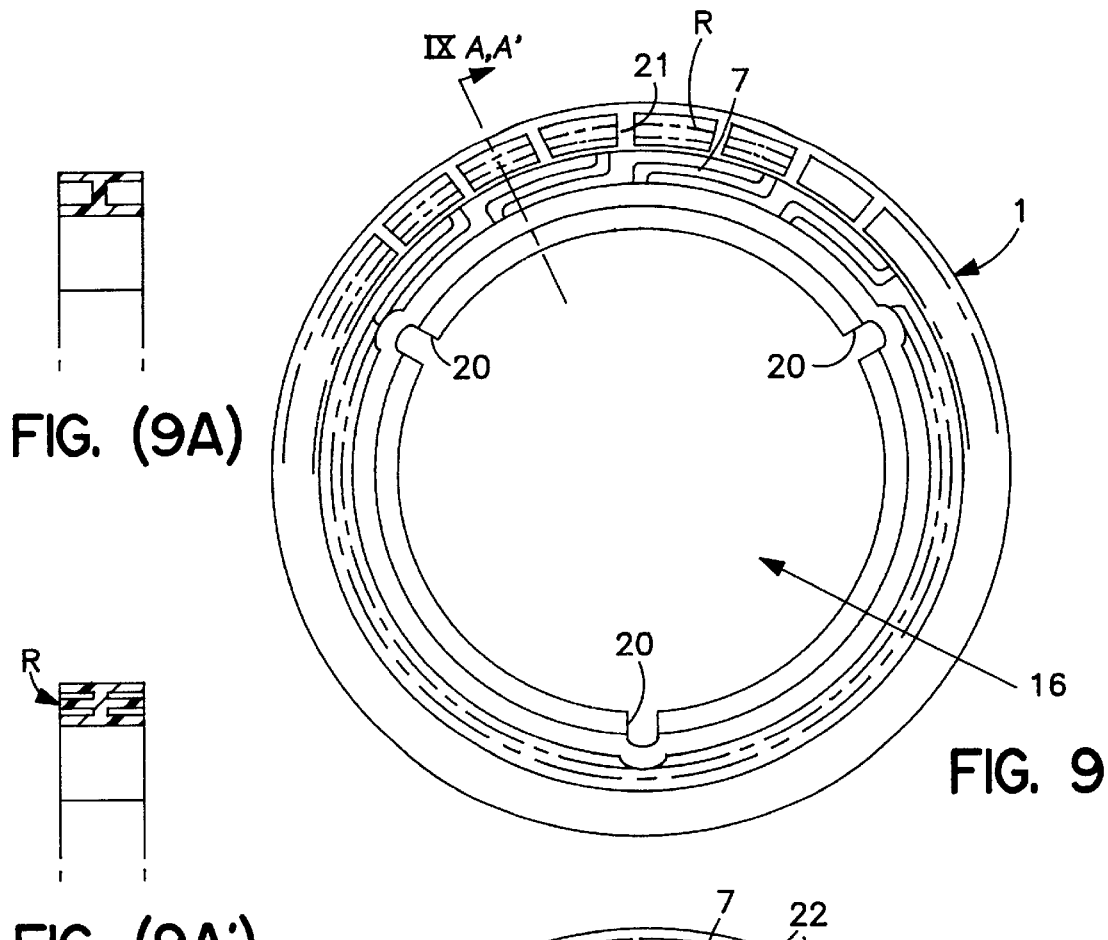

As can be seen from the cross-sections A and A' in FIG. 9 the above described double-T-profile can be strengthened by radial webs 21 and/or by another annular ring R in the middle between the double-T-form.

Figure 10:
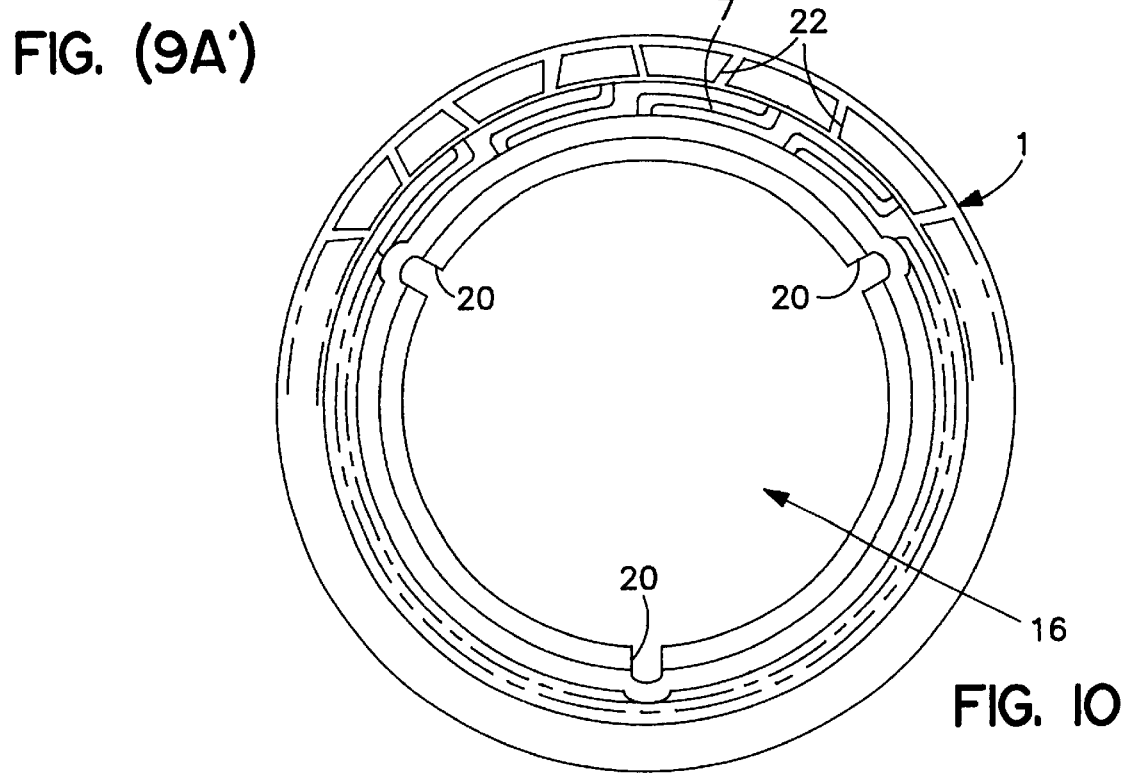

FIG. 10 shows slightly oblique webs 22 for reinforcing purposes. Advantageous is a trapezoidal arrangement of the webs 22 with the rings.

Figure 13:
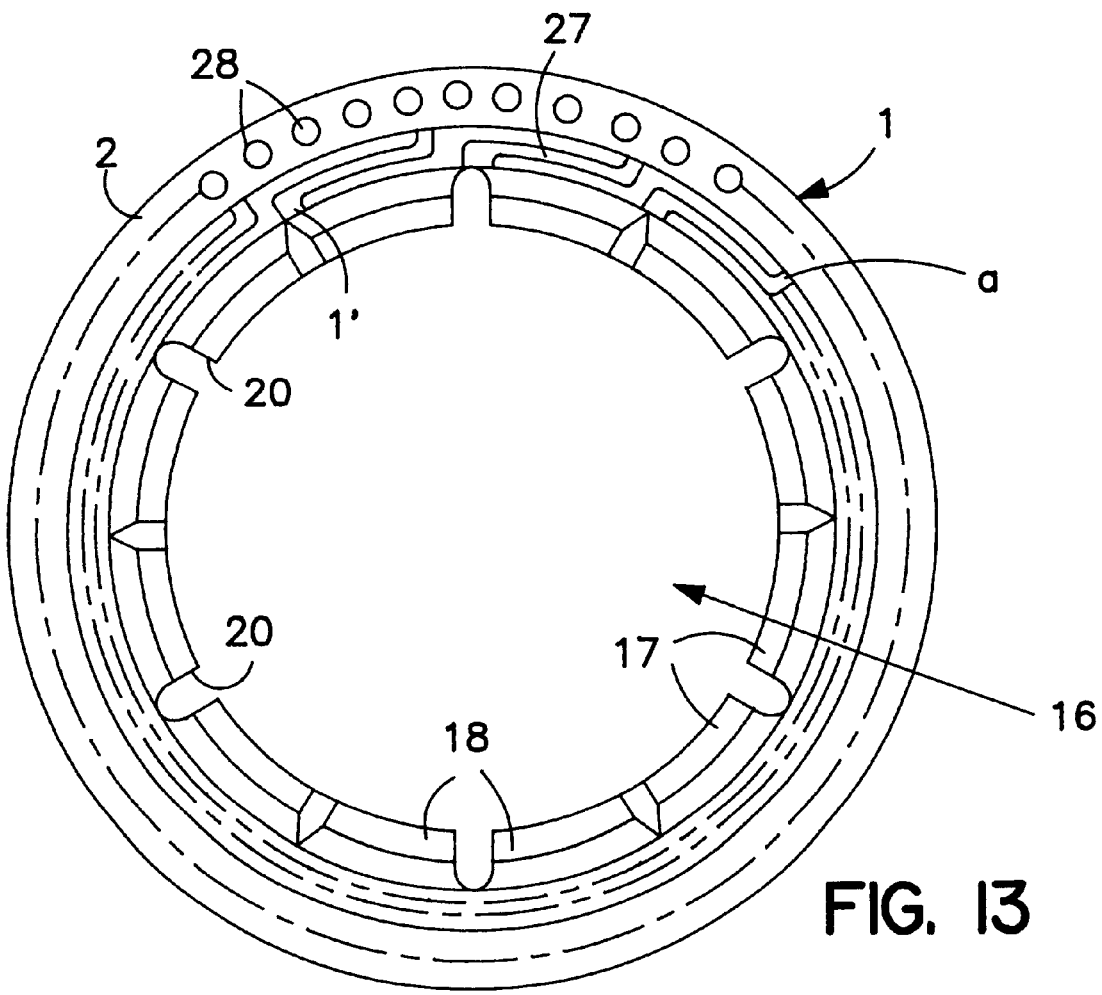

In FIGS. 11 and 12 the outer ring 2 is provided with annular indentations 23, 24 or 25, 26 respectively from either side of the hub. The rigidity substantially corresponds to that of the double-T- or double-H-profiles showing in FIG. 9. FIG. 13 shows an outer ring 2 which possesses adjacent its outer periphery (winding area 1) a series of going-through bores 28 which are arranged close to one another.

In this example the S-form webs 27 have a different thickness at their inner (i) and outer (a) radial portions. The inner portions (i) are thicker than the outer ones (a).

FIG. 14 shows specifically shaped S-form webs 47. Each web 47 consists of a circumferential or middle portions 43,43' and outer and inner radial portions 44' and 45'. A radius beam 46 is shown. Each middle portion 43,43' of the webs 47 is slightly slanted and thus is located at an angle of $\alpha, \alpha'$ being in the range of $85° \leq \alpha, \alpha' \leq 95°$.

As shown in FIG. 14 the S-form web 47 has an angle $\alpha \sim 85°$ versus the radius beam 46 and the following web 47' has another angle $\alpha \sim 95°$ versus the radius beam 46. Thus the elements 47 and 47' can be provided with alternating angles $\alpha$ and $\alpha'$ respectively. There should be used pairs of such webs 47 and 47' so that an equal number of webs 47 and 47' results. There have been obtained still better results in the $\Delta Di/\Delta Da$ ratio as in the table at the end of the application.

Likewise good results with respect to the deviation ratio of diameters Di divided by Da have been reached by the following embodiment. Therein (FIG. 15) two adjacent webs 47'' and 47''' are located symmetrically to the radius beam 46 between one another. Also pairs of such mirror-like located S-form webs 47'' and 47''' should be provided on each hub 41. Such S-form webs 47'' and 47''' could also be formed like one of the webs 47 and 47' in FIG. 14, so that both webs 47'' and 47''' have the same angle $\alpha$ or $\alpha'$ versus the radius beam 46. The anlge $\alpha$ can be varied to $\alpha'$ at the next following pair of webs.

Figure 16:
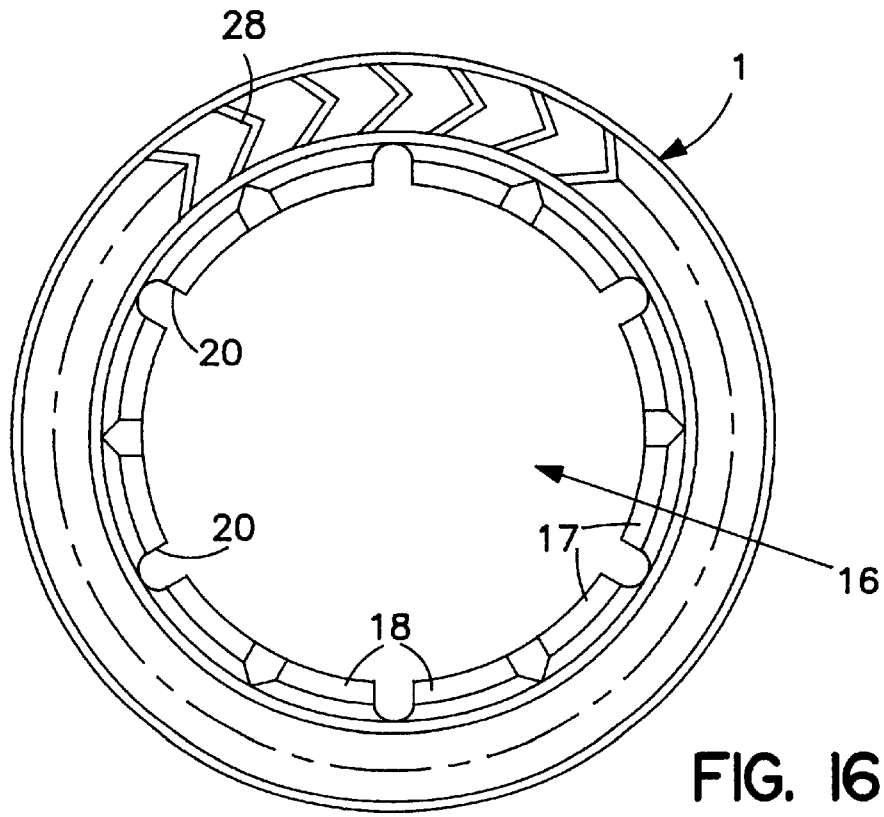
Figure 17:
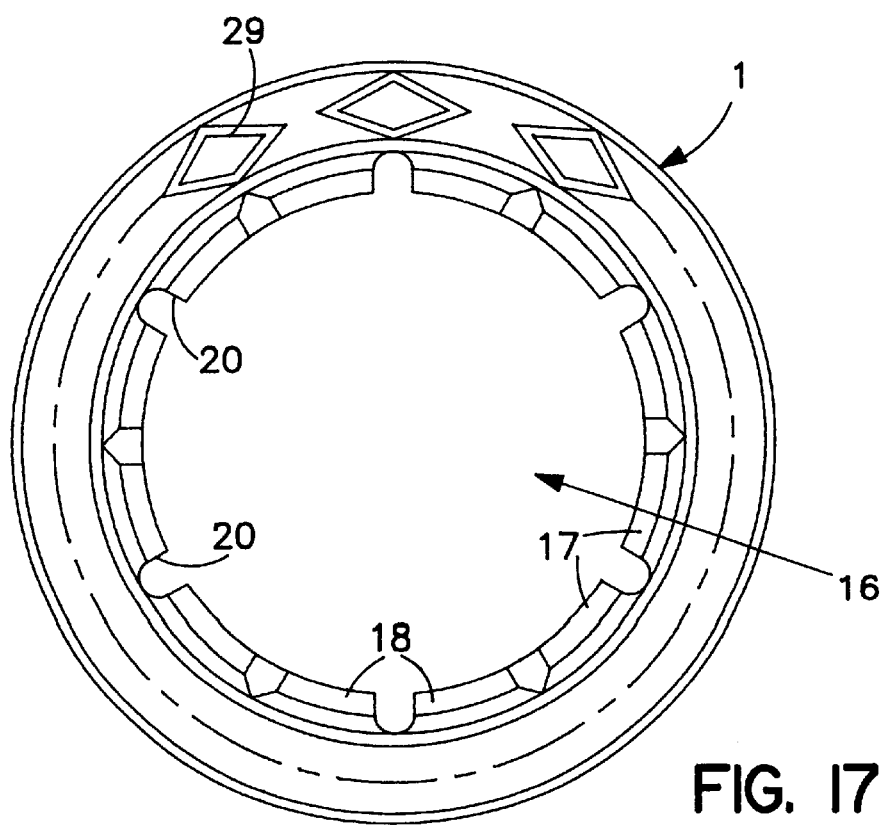

The same advantages as described above can be obtained by the hubs embodiments in FIGS. 16 to 19. FIG. 16 shows chevron-like formed webs 28 directed in the circumference. FIG. 17 shows a rhombus-shaped web 29. The distances between two subsequent webs 28 or 29 respectively are going-through openings.

Figure 18:
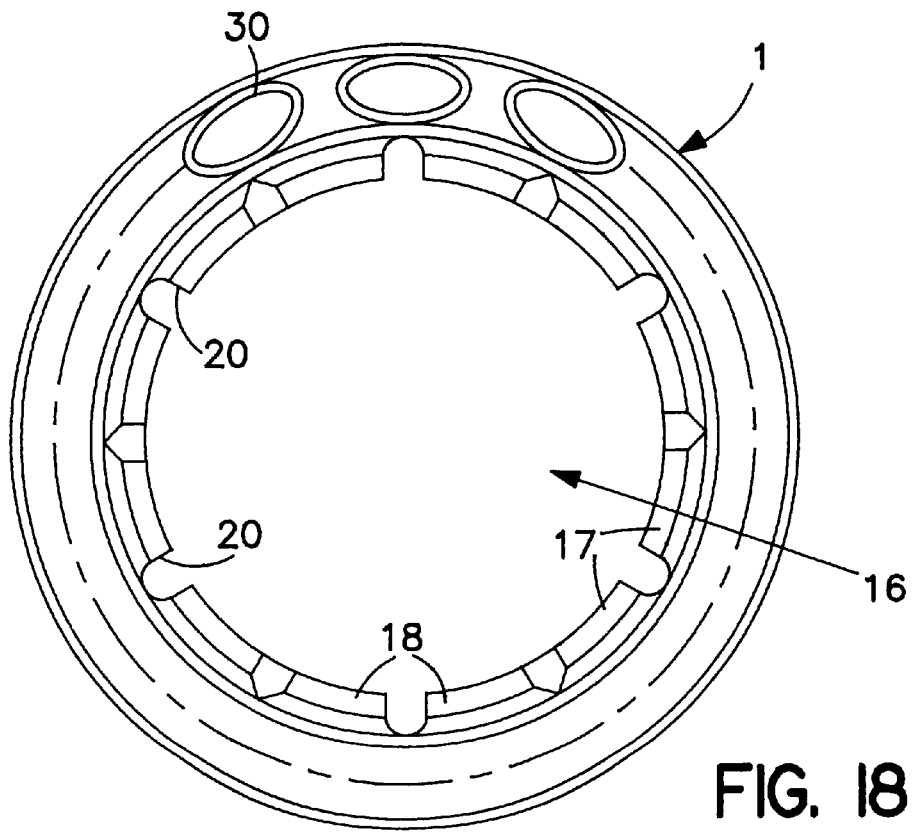
Figure 19:
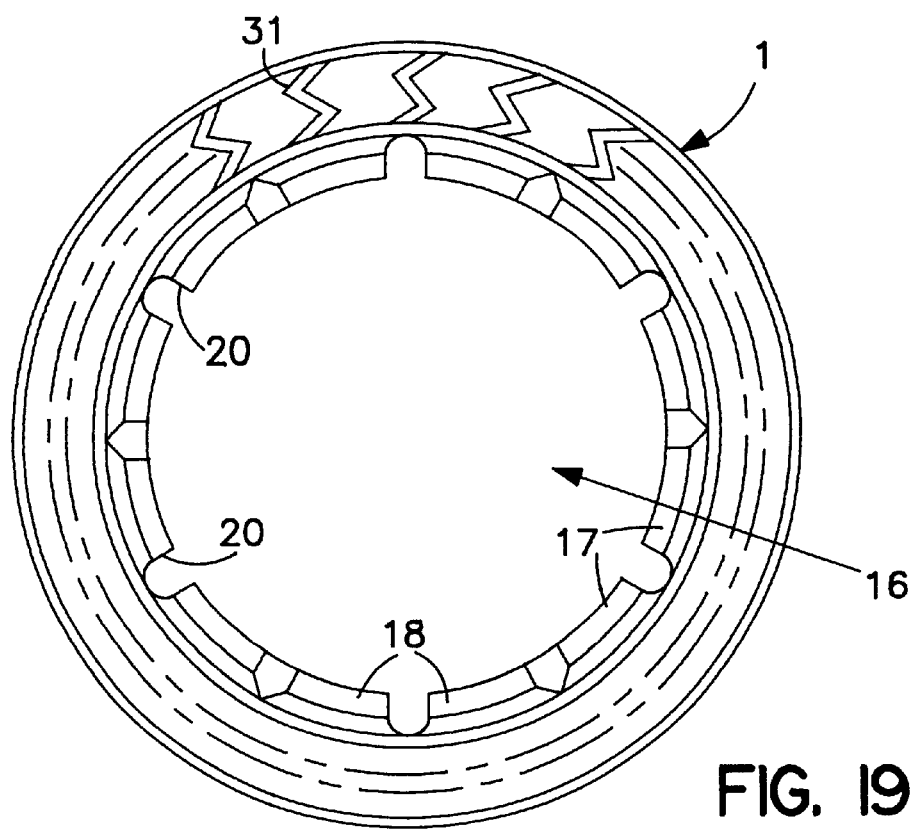

FIG. 18 contains an egg-like form of web 30. It is also possible to connect two or more subsequent webs 30 together. FIG. 19 has a zig-zag formed web 31 as the flexible deformable intermediate element. Within the closed webs 29 and 30 there are going-through openings as well as between two subsequent webs 28 to 31.

Each and all webs of FIGS. 16 to 19 can replace the S-form webs 7 and 27 in the foregoing figures.

All herein described webs can advantageously have a thickness of 0.6 mm in minimum and normally about 1 mm and a width of substantial the width of the winding area 1.

It is possible to use suitable web forms together with suitable thermoplastic materials which are injection moldable. Such thermoplastics must not contain any filler materials e.g., glass fibers, glass beads and other reinforcing fillers.

Useful for hubs according the present invention are thermoplastics in general in particular the following:

Polystyrene, ABS (Acrylo Nitrile Butadiene Styrene copolymers)

Mixture of polybutyleneterephthalate with a polycarbonate.

PVC (Polyvinylchloride) (pls see the Examples)

Polyamide

EXAMPLE 1

Figure 1:
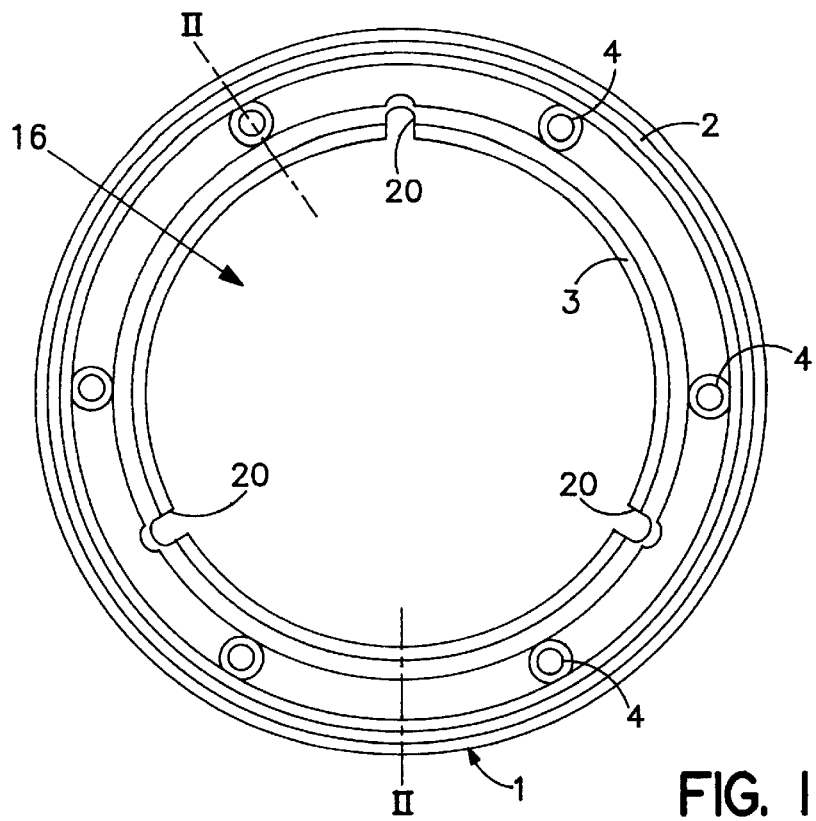
Figure 2:
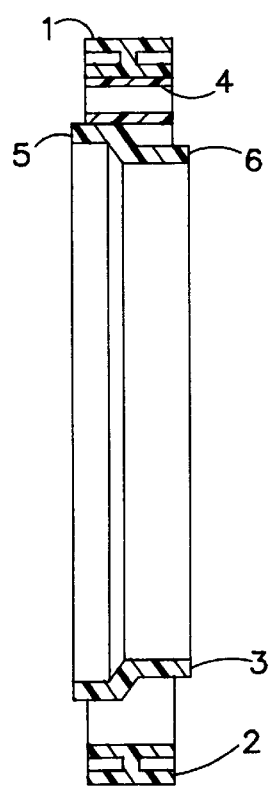

On a hub having an outside diameter Da of 114 mm, a bore inside diameter Di of 77 mm and having a width of 15 mm, consisting of polyvinyl chloride without further additives and, as represented in FIG. 1, provided with 6 annular flexible intermediate elements and double-T structure, a half-inch video magnetic tape of a total thickness of 15.6 $\mu$m and a length of 5000 m was wound up by a conventional winding apparatus and at a speed of 450 m/min. During this operation, the winding parameters, that is tape tension and pressure of the contact roller pressing the magnetic tape onto the hub, were chosen in such a way that a winding pressure of 25 bar (25 N/mm$^2$) acted on the winding surface of the hub.

EXAMPLE 2

Figure 3:
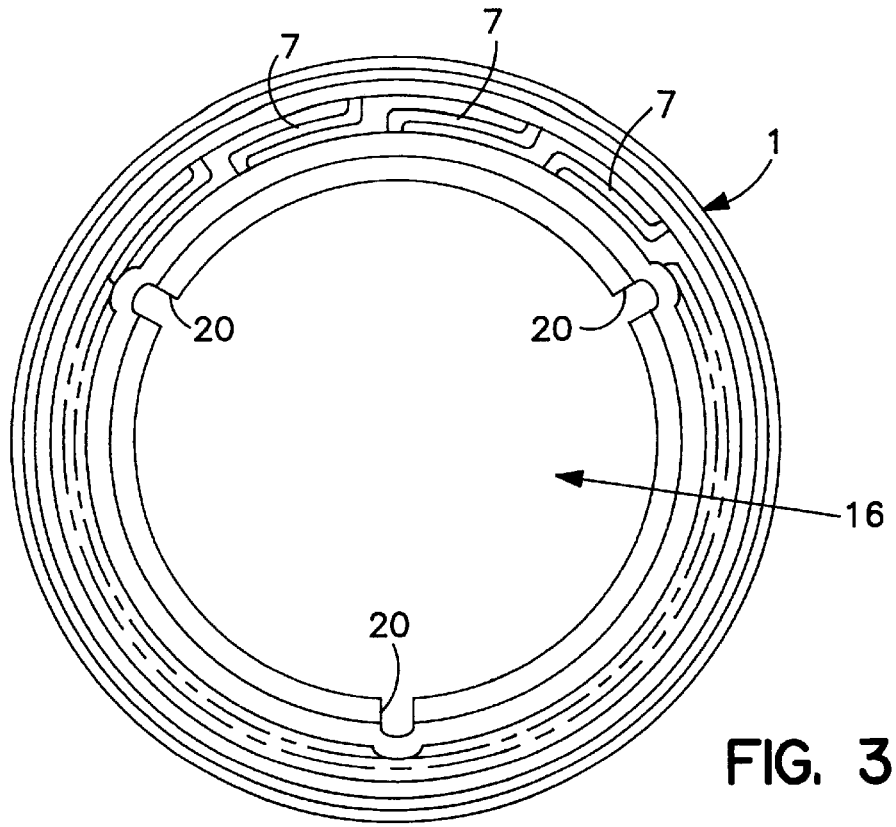

On a hub having an outside diameter Da of 114 mm, a bore inside diameter of 77 mm and having a width of 15 mm, consisting of polyamide without further additives and, as represented in FIG. 3, provided with 12 S-shaped flexible intermediate elements and double-T structure, a half-inch video magnetic tape of a total thickness of 19 $\mu$m and a length of 5000 m was wound up, as described in Example 1.

COMPARATIVE EXAMPLE

A commercially available hub, known as a NARTB hub, consisting of glass fiber reinforced polystyrene and having the same dimensions as in Example 1 but a cross-sectional constriction between outside diameter and inner bore and 9 radial webs on both sides, was wound with the sample tape under precisely the same conditions as in Example 1.

The following table shows the reduction in the hub diameters $\Delta$ Da, $\Delta$ Di on the wound hub of the example according to the invention in comparison with a hub according to the prior art.

TABLE

| Hub accordings to | Example 1 | Example 1 | Comparative example |
|---|---|---|---|
| Modulus of elasticity N mm$^{-2}$ | 3800 | 3000 | 5500 |
| $\Delta$Da | 0.5 mm | 0.3 mm | 0.5 mm |
| $\Delta$Di | 0.1 mm | 0.06 mm | 0.4 mm |
| $\frac{\Delta Da}{\Delta Di}$ | 0.2 | 0.2 | 0.8 |

Results

Example 1 and 2

$$\frac{\Delta Di}{\Delta Da} = \frac{1}{5}$$

COMPARATIVE EXAMPLE $$\frac{\Delta Di}{\Delta Da} = \frac{4}{5} = \frac{1}{1,25}$$

Examples 3 to 6 have been performed with hubs for audio tapes. Such hub has the same diameters Da=114 mm and Di=77 mm as the hub for video tapes in Examples 1 to 2 and the Comparative Example.

On the hub a 3.81 mm audio magnetic tape of a total thickness of 12 $\mu$m and a length of 3300 m was wound up at a speed of 250 m/min. The mean winding pressure acting on the wending surface of the hub was chosen to 15 bar.

EXAMPLE 3

Material: Polystyrene without fillers

Design: FIG. 3 (including flexible elements)

EXAMPLE 4

Material: Polystyrene without fillers

Design: FIG. 13 (including flexible elements)

EXAMPLE 5

Material: Styrene Acrylo Nitrile with 30% glass fibers

Design: according to DE 24 48 853 (without any flexible elements)

EXAMPLE 6

Material: Styrene Acrylo Nitrile

Figure 4:
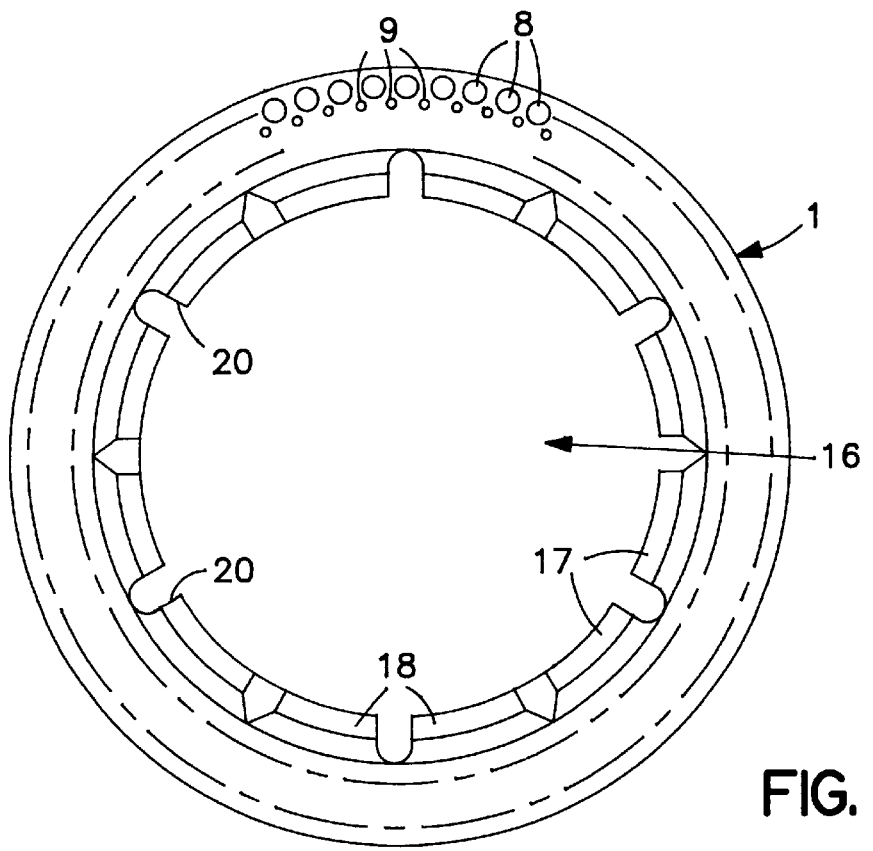
Figure 5:
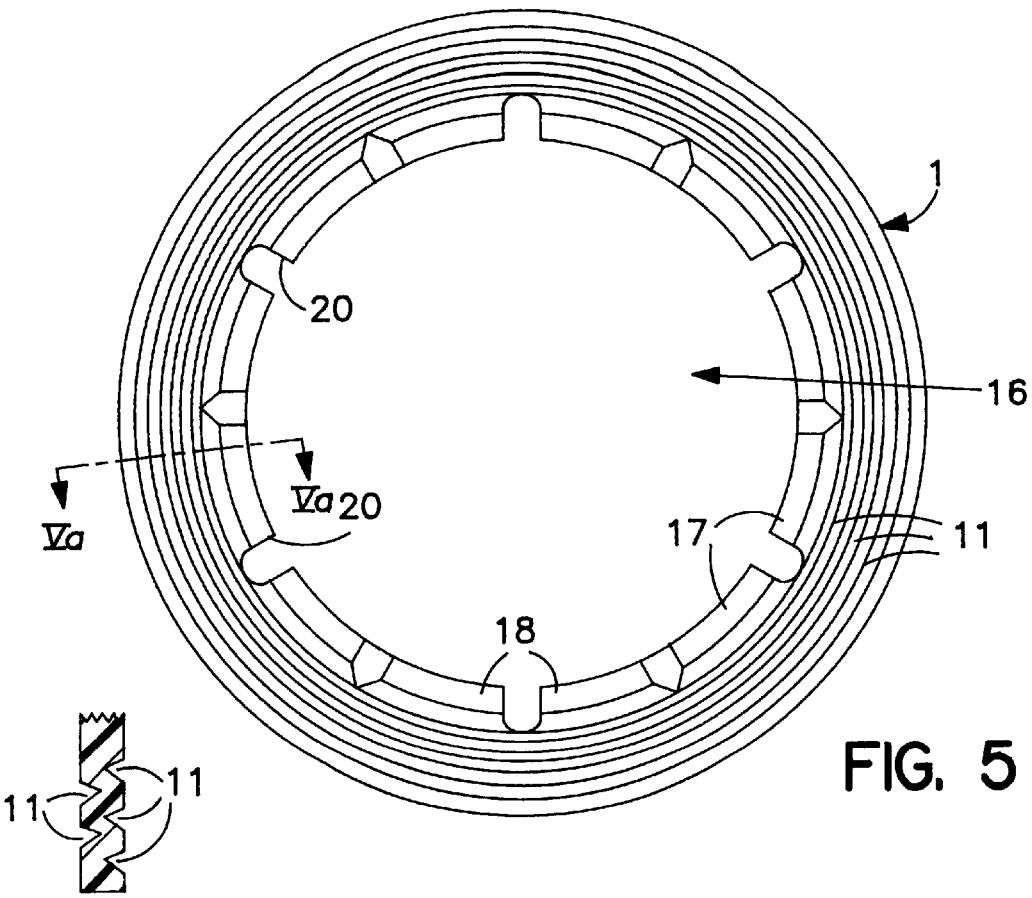
Figure 6:
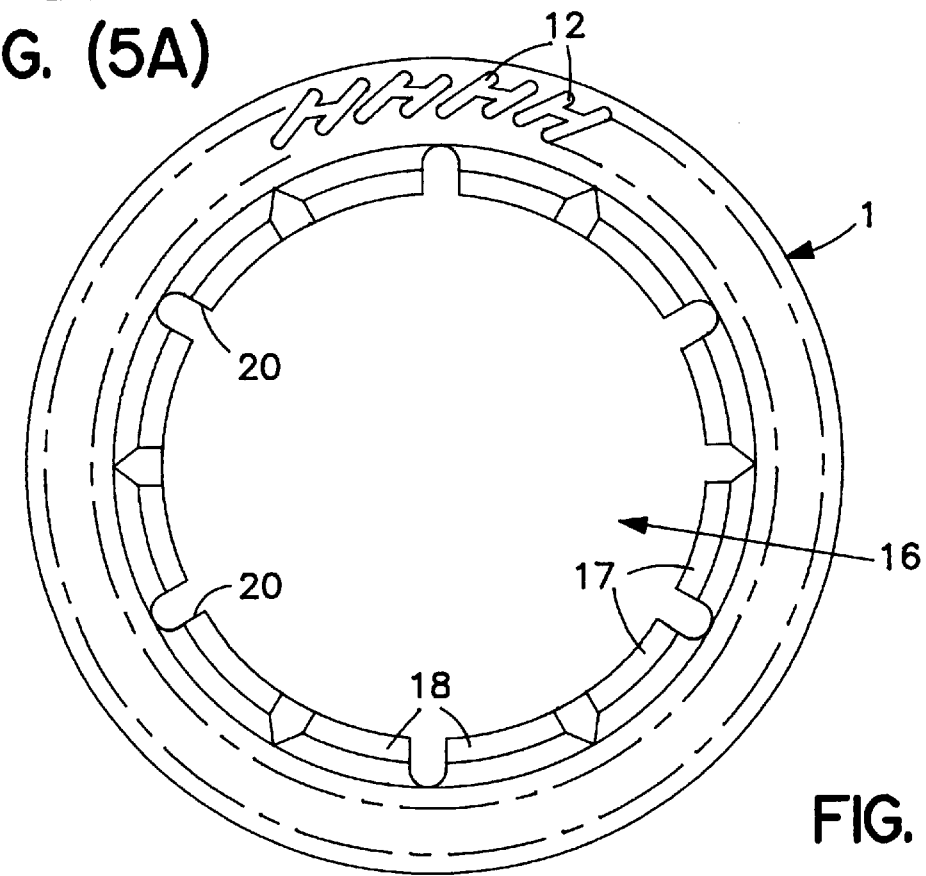
Figure 7:
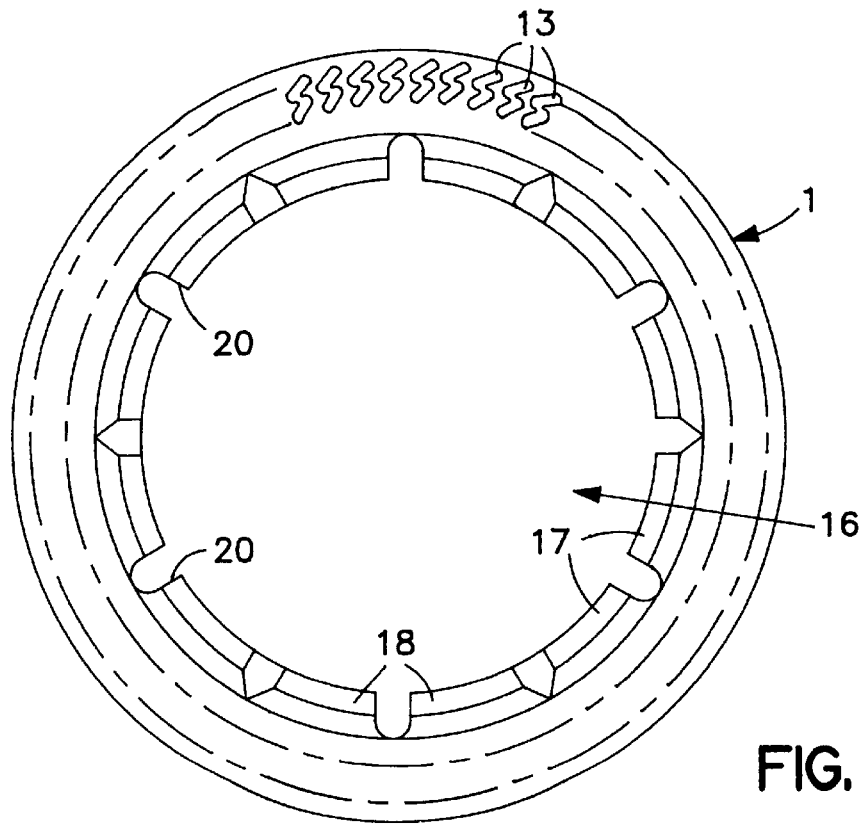
FIG. 7 shows openings in zig-zag form 13.
Figure 8:
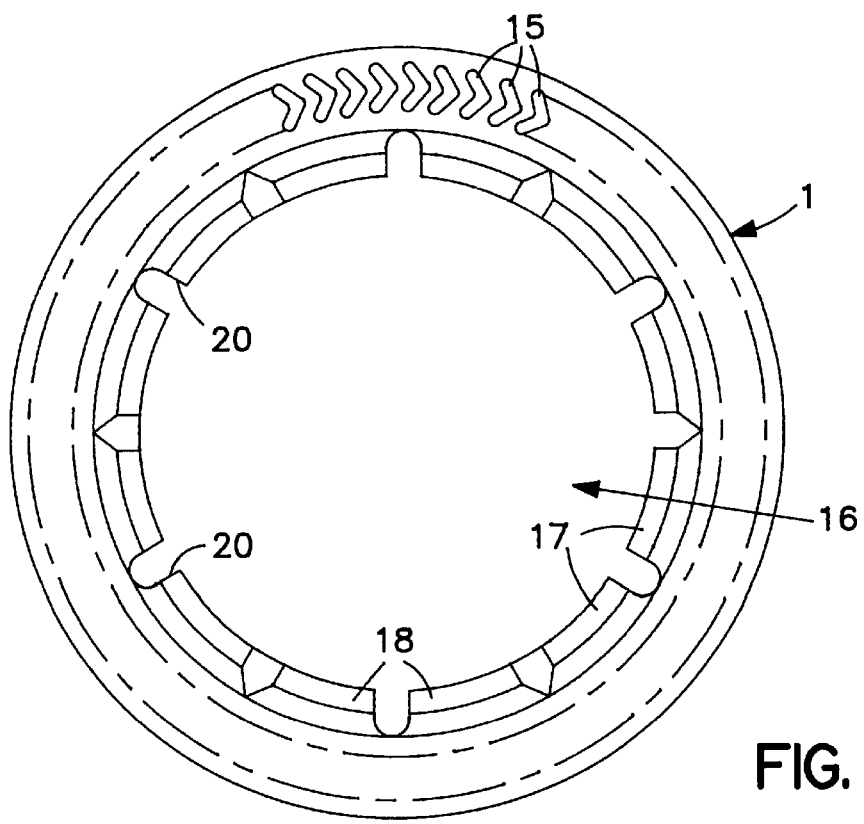
FIG. 8 represents chevron-like openings 15 in the circumferential direction.

Design: FIG. 4 (with annularly arranged holes as sole flexible elements)

| Hub | Example 3 | Example 4 | Example 5 | Example 6 |
|---|---|---|---|---|
| Modulls of Elasticity N/mm$^{-2}$ | 3200 | 3200 | 5000 | 5000 |
| Da | 0.2 | 0.2 | 0.2 | 0.2 |

| Hub | Example 3 | Example 4 | Example 5 | Example 6 |
| --- | --- | --- | --- | --- |
| Di | 0.04 | 0.04 | 0.1 | 0.06 |
| ΔDi/ΔDa | 0.20 | 0.20 | 0.50 | 0.30 |

The examples 3 and 4 of the inventive designs show that the deviations in the diameters lying with 0.2=⅕ (a fifth) under the limit the compression ratio of 1:4 of the present invention.

Measurement Description

In the above Examples 1–6 and the Comparative Example the deviations in the diameters of the hubs were measured by polar distance (the distance from a predetermined fixed point e.g. the midpoint) of the circular form of the outer and inner hub peripheries. The hub was hold at the three driving cut-outs e.g. in FIG. 3 and at 6 equidistant points between two cut-outs there the polar distance value was measured. The maximum value was taken as the value in the above tables.

Results of the tests

Practically it has been found in tests that a ratio of $$\frac{\Delta Di}{\Delta Da} = \frac{1}{4}$$

is at maximum tolerable because the hubs could be still removed from the axle whereon the hub is provided with the media pancake at very high winding speeds.

For still easier removal of the hubs with their pancakes thereon the ration of 1:5 is far better.

In the comparative Example more than 50% of the hubs could not been removed after the winding process was finished.

As regards the hub materials it is important that the used material does not constrict under longer treatment under higher temperatures.

We claim:

1. A hub for wound-up information media in strip or tape form, the width of the outer winding area of the hub substantially corresponding to the width of the medium to be wound up, the hub having a central bore forming an inner circumference of the hub and cut-outs thereon for being driven by a spindle and comprising an outer ring and an inner ring which are connected to each other by flexibly deformable intermediate elements extending in radial and circumferential directions, but preventing any relative movement of the outer ring relative to the inner ring in the circumferential direction of the outer ring, the hub with the medium wound thereon having a compression ratio of the compressed diameter of the inner ring to the compressed diameter of the outer ring of less than 1:4.

2. A hub as claimed in claim 1, wherein said flexible intermediate elements are S-shaped webs extending in radial and circumferential directions.

3. A hub as claimed in claim 2, wherein there are an even number of said S-shaped webs.

4. A hub as claimed in claim 2, wherein individual S-shaped webs are positioned symmetrically on both sides of a radius of the hub which separates the individual S-shaped webs.

5. A hub as claimed in claim 1, wherein said flexible intermediate elements are webs each in an egg-form.

6. A hub as claimed in claim 1, wherein said flexible intermediate elements are webs each in a zig-zag form.

7. A hub as claimed in claim 1, wherein said flexible intermediate elements are webs each in a chevron-like form in the circumferential direction.

8. A hub as claimed in claim 1, wherein said flexible intermediate elements are webs each in the form of a rhombus with the long axis thereof in the circumferential direction.

9. A hub as claimed in claim 1, wherein said flexible intermediate elements consist of a combination of a) flexible webs running in radial and circumferential directions and b) residual portions between openings arranged in a sequence, said openings being located between the periphery of the outer ring and said flexible webs.

10. A hub as claimed in claim 1, wherein said flexible intermediate elements are S-shaped webs each of which consist of a circumferential portion with a substantially radial portion at each end thereof.

11. A hub as claimed in claim 1, wherein said flexible intermediate elements are S-shaped webs each of which consist of a substantially circumferential portion with a radial portion at each end thereof and wherein the substantially circumferential portion is arranged in an angle from about 85° to about 95° with respect to any radius of the hub.

* * * * *